United States Patent [19]

Behrens

[11] 4,248,331
[45] Feb. 3, 1981

[54] CLUTCH-BRAKE CONTROLS FOR A LAWN AND GARDEN TRACTOR

[75] Inventor: Robert N. Behrens, Horicon, Wis.

[73] Assignee: Deere & Company, Moline, Ill.

[21] Appl. No.: 21,056

[22] Filed: Mar. 16, 1979

[51] Int. Cl.³ .............................................. B60K 41/24
[52] U.S. Cl. ................. 192/13 R; 192/17 R; 192/14; 192/114 R
[58] Field of Search .................. 192/17 R, 13 R, 12 R, 192/114 R, 14

[56] References Cited

U.S. PATENT DOCUMENTS

| 1,990,748 | 2/1935 | Oberkircher et al. | 192/13 R |
| 2,217,230 | 10/1940 | Morphet | 192/13 R |
| 3,709,344 | 1/1973 | Sieren | 192/13 R |

OTHER PUBLICATIONS

John Deere Service Manual 3040 Tractors, Nov. 1969, pp. 5-2, 10-1 to 10-3, 10-6 to 10-8, 10-13 and 10-14.

Primary Examiner—Kenneth Downey

[57] ABSTRACT

A combined clutch and brake control is provided for a lawn and garden tractor of the type including a traction drive transmission, formed in part by an infinitely variable pulley, and including a traction drive brake. The control includes a clutch brake pedal adapted for connection to the infinitely variable pulley and to the brake and operable when depressed to act on the pulley to sequentially reduce the transmission speed to zero and then apply the brake; and includes a brake pedal coupled to the brake and operable to apply the brake to prevent rolling during hillside operation when the clutch-brake pedal is being depressed through a neutral range or zone located between clutching or speed reducing and braking ranges. An adjustable spring is connected to the brake for limiting the amount of force applied thereto via operation of the clutch-brake and brake pedals.

4 Claims, 2 Drawing Figures

CLUTCH-BRAKE CONTROLS FOR A LAWN AND GARDEN TRACTOR

BACKGROUND OF THE INVENTION

The present invention relates to controls for lawn and garden tractors and more specifically relates to clutch-brake controls for the traction or propel drives of such tractors.

The prior art includes lawn and garden tractors having variable speed traction drives and brakes for such drives. In one type of traction drive brake and clutch control for such tractors, the traction drive is sequentially slowed and then neutralized by operation of a clutch pedal while the brake is engaged by operation of a brake pedal. Also disclosed is a park lock mechanism which is operable to lock the brake pedal in a depressed brake-engage position only after the clutch pedal has been moved to a depressed drive disengage position to thus ensure that the tractor is not driven with the brake held in its engaged position by the park lock mechanism. An example of such controls is illustrated in U.S. Pat. No. 4,037,695 issued to Welck on July 26, 1977.

In another type of design, a single clutch-brake pedal is coupled to the transmission and brake such that, as the pedal is moved through an initial or clutching range of movement, the transmission speed will be decreased to zero which condition remains as the pedal is moved through an intermediate or neutral range of movement. A final or braking range of movement of the pedal results in the brake being applied.

The first of the aforementioned types of control designs has the disadvantage that an operator may apply the brake by depressing the brake pedal before he has fully depressed the clutch pedal. This results in the brakes being applied while the vehicle is being driven thus causing excessive brake wear.

The second of the aforementioned types of control designs has the disadvantage that, if the tractor is being stopped or shifted while ascending or descending a hill, it may continue or begin to roll downhill during movement of the clutch-brake pedal through its clutching and neutral ranges. This may result in the tractor proceeding toward some perilous condition and/or developing such momentum that it is difficult to quickly halt the movement of the tractor.

A further disadvantage of both of the aforedescribed types of controls is that the linkage connecting the pedals to the brake are such that excessively high braking forces may be transferred to the brakes resulting in excessive wear and/or in premature failure of the same.

SUMMARY OF THE INVENTION

According to the present invention there is provided novel controls for the traction transmission clutch and brake of a lawn and garden tractor.

An object of the invention is to provide a control for the traction transmission clutch and brake of a lawn and garden tractor, which control includes a clutch-brake pedal coupled for sequentially neutralizing the transmission and then applying the brake, when the tractor is in normal use on relatively level terrain, and further includes a brake pedal coupled for selectively applying the brake to prevent the tractor from rolling downhill when the clutch-brake pedal is positioned for neutralizing the transmission during operation of the tractor on hilly terrain.

Another object of the invention is to provide a control, as set forth in the previous object, which includes a force transmitting member for transmitting a predetermined maximum force to the brake.

These and other objects will become apparent from reading the ensuing description together with the appended drawings.

DESCRIPTION OF THE PREFERRED EMBODIMENT

Figure 1:
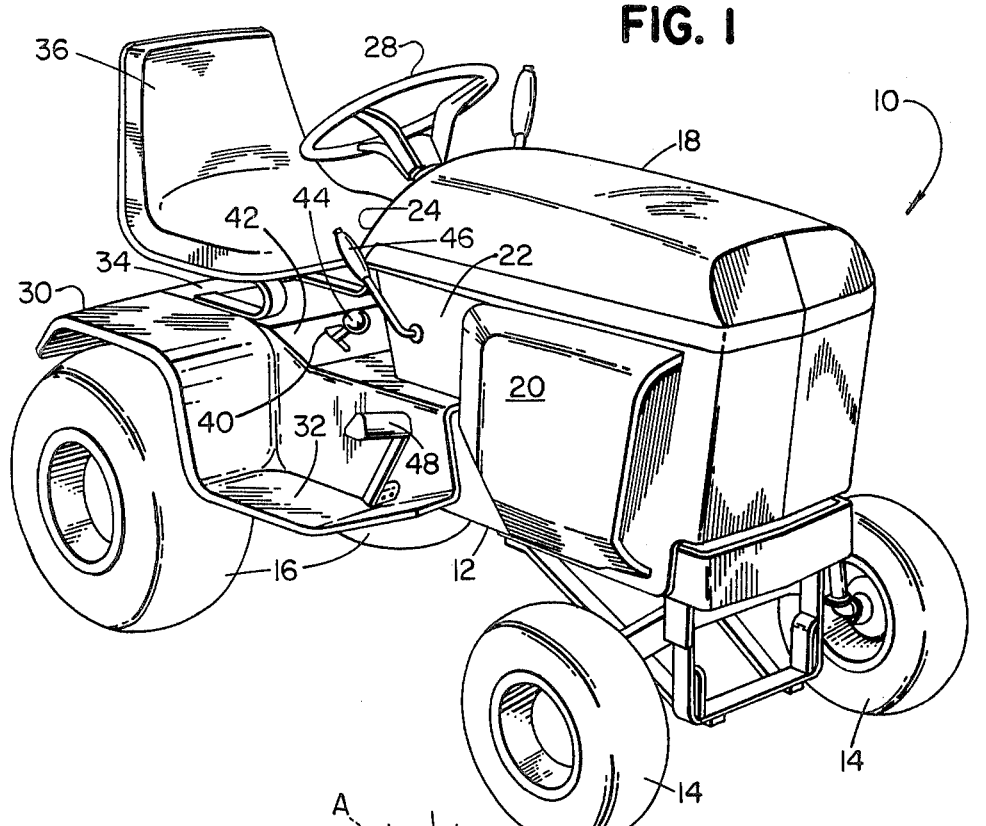
FIG. 1 is a right front perspective view of a lawn and garden tractor embodying a transmission clutch and brake control constructed in accordance with the principles of the present invention.

Referring now to FIG. 1, therein is shown a lawn and garden tractor indicated in its entirety by the reference numeral 10. The tractor 10 includes a main frame 12 supported on a front pair of ground wheels 14 and on a rear pair of traction drive wheels 16. A hood 18 cooperates with opposite side members 20 (only the right side is shown) to define an engine compartment having an engine (not shown) mounted in the forward portion thereof. A pedestal 22 is fixed to the frame 12 at the rear of the hood 18 and projecting centrally through an instrument panel 24 carried by the pedestal is a steering column having a steering wheel 28 fixed thereto. Fixed to and overlying a rear portion of the frame 12 is a unitary structure defining a pair of fenders 30 (only the right one is shown) having a pair of footrests 32 forming forward continuations thereof and having a horizontal platform 34 extending therebetween. Mounted on the platform 34 is a seat 36. The platform 34 overlies a transaxle (not shown) and, projecting through a shift gate 40 located in a portion 42 of the unitary structure which inclines downwardly and forwardly from the platform 34, is a shift lever 44 for selectively effecting ratio and direction changes in or for neutralizing the transaxle.

A variator traction drive (not shown) of a known type connects an output shaft of the engine with an input shaft to the transaxle and a speed control lever 46, located at the right side of the pedestal 22, is coupled to an infinitely variable pulley of the drive for selectively adjusting the latter between first and second extreme positions for effecting increasing drive speeds from zero to a maximum.

Thus, it will be appreciated that the variator traction drive and the transaxle combine to form the traction drive transmission of the tractor 10.

Mounted at the right and left sides of the tractor at respective locations just forwardly of the footrests 32 are a brake pedal 48 and a clutch-brake pedal 50.

Figure 2:
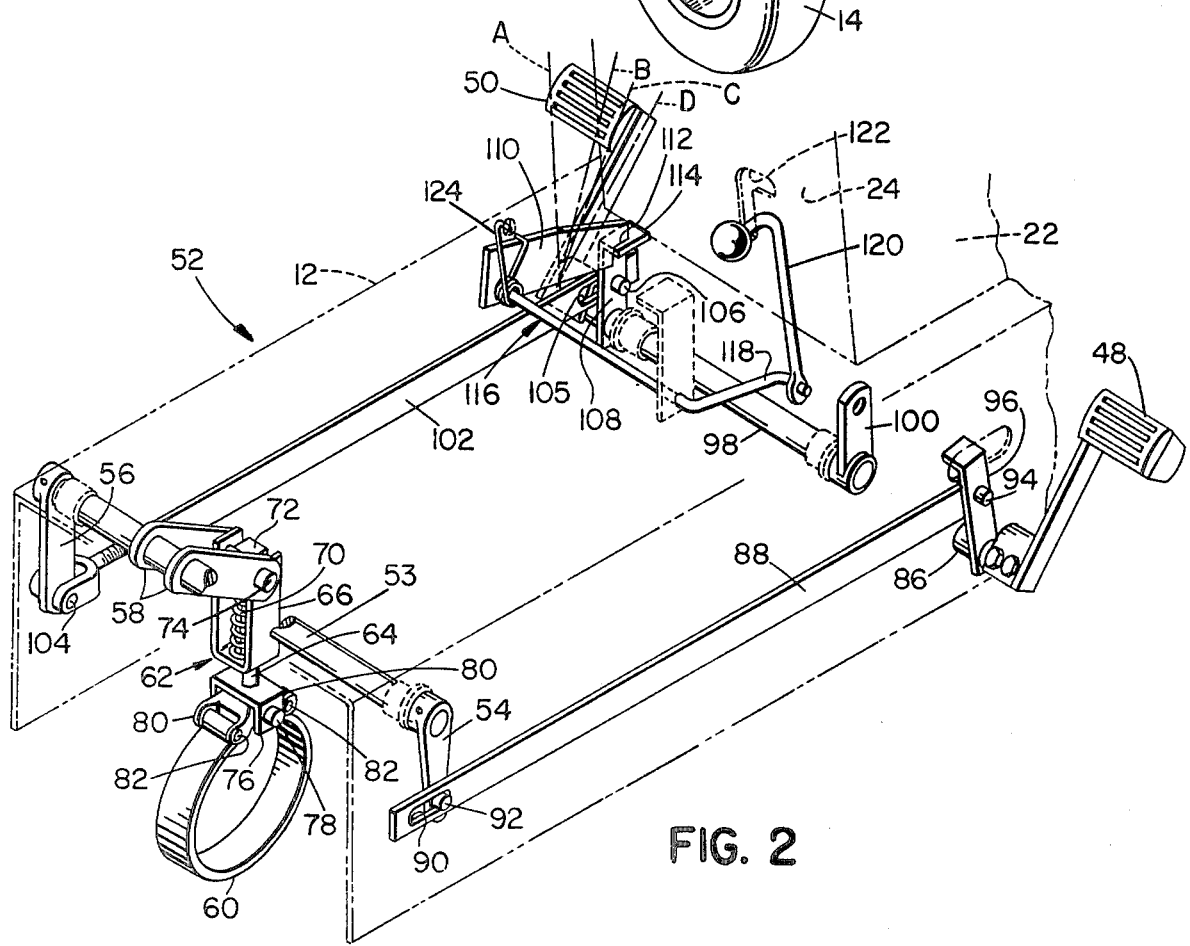
FIG. 2 is a right rear perspective view of the transmission clutch and brake control showing the control linkage in full lines in the position it occupies when the park brake lock is engaged and showing the support structure for the linkage in phantom lines.

Referring now to FIG. 2, it can be seen that the pedals 48 and 50 form part of a brake and clutch control linkage 52. A crosswise brake control shaft 53 is journaled in the rear portion of the frame 12 and includes right and left crank arms 54 and 56 respectively, fixed to right and left ends thereof in depending relation thereto and includes an intermediate crank arm 58 comprising a pair of forwardly projecting parallel spaced straps. The crank arm 58 is linked to opposite ends of a brake band 60 by means of a spring assembly 62 comprising a rod 64 reciprocally mounted in a U-shaped bracket 66 and carrying a stop pin (not shown) at a location below the bracket 66 and biased thereagainst, by means of a coil compression spring 70 received on the rod 64 and acting between a head 72 of the rod and the bracket 66. The intermediate crank arm 58 is pivotally connected to the top of the bracket 66 by a pin 74 while the bottom of the pin 64 is provided with a yoke 76 pivotally connected, as at pin 78, to respective first ends of a pair of links 80 respectively having their other ends pivotally connected to opposite ends of the band 60 by pivot pins 82. Thus, it will be appreciated that counterclockwise rotation of the brake control shaft 53, as viewed from the right end thereof will result in the bracket 66 being lifted to transfer motion to the rod 64 via the spring 70, which in turn, will result in the brake band ends being moved towards each other to effect tightening of the brake band 60 on a drum (not shown) fixed on the end of a shaft projecting from the transaxle. Further, it will be appreciated that the force transferred to the brake band is dependent upon the precompression of the spring 70 since once the force being transferred equals that necessary for overcoming the force exerted by the spring 70 further upward motion of the bracket 66 will act to further compress the spring 70 instead of being transferred to the brake band ends.

The brake pedal 48 is fixed to the outer end of a stub shaft 86 rotatably journaled in the frame 12. For transferring pedal movement to the brake control shaft 53, a fore-and-aft extending transfer link 88 is provided, the rearward end of the link 88 being provided with a lost motion slot 90 received on a pin 92 carried by the crank arm 54 and the forward end of the link being pivotally connected, as at 94, to a crank arm 96 fixed to the stub shaft 86.

The clutch-brake pedal 50 is fixed to the left end of a crosswise clutch control shaft 98 rotatably supported by the frame 12. A crank arm 100 is fixed to the right end of the shaft 98 and is adapted to be linked to the same infinitely variable pulley to which the speed control lever 46 is coupled and is adapted to operate the pulley, in response to depression of the pedal 50, to effect a gradual decrease of the tractor speed from that selected by the lever 46 to zero as the pedal moves through a first variable speed range A-B, to maintain the zero drive speed condition as the pedal is further depressed through a neutral range B-C. Provided for effecting braking of the propel drive as the pedal 50 is depressed beyond the neutral range into a braking range C-D is a length-adjustable, fore-and-aft extending link 102 having a yoke at its rear end pinned to the lower end of the crank arm 56, as at 104, and having a lost motion slot 105 received on a pin 106 carried by a crank arm 108 fixed to the clutch control shaft 98.

For locking the clutch-brake pedal 50 in a fully-depressed braking position, as shown, there is provided a park-brake pawl 110 having a notched forward end 112 receiving a bent over upper end 114 of the crank arm 108. The pawl 110 is fixed to the left end of a pivotally mounted control rod 116 having a cranked right end portion 118 to which a park lock control handle 120 is connected, the handle 120 having a backturned upper end projecting through an inverted L-shaped guide slot 122 provided in a rear wall 124 of the pedestal 22. A torsion spring 124 is received on the rod 116 adjacent the pawl 110 and acts between the latter and the frame 12 so as to bias the pawl towards its pedal-lock position shown. Thus, the clutch-brake pedal 50 may be selectively locked in its brake-engage position shown by placing the control rod 116 in the vertical leg of the guide slot 122 and then by depressing the pedal 50 to its fully depressed position whereby the spring 124 acts to engage the pawl 110 with the bent over upper end 114 of the crank arm 108. The park lock is released by depressing the pedal 50 to release the pawl 110 and then by lifting the control handle 120 to and placing it in the horizontal leg of the slot 122.

It will be apparent then that the clutch-brake pedal 50 may be depressed to effect engagement of the brake band 60 with a rotating part of the transaxle, the depression of the pedal 50 first acting to reduce the traction drive speed input to the transaxle to zero. When the clutch-brake pedal 50 is actuated to effect engagement of the brake band 60, the brake pedal 48 will remain undisturbed due to the lost motion slot 90. Similarly, the brake pedal 48 may be operated independently of the pedal 50 without disturbing the pedal 50 due to the lost motion slot 105.

I claim:

1. A clutch and brake control for a traction drive transmission, comprising: a support frame; a clutch control shaft and a brake control shaft disposed parallel to each other and respectively rotatably supported by the frame; a clutch-brake pedal fixed to one end of the clutch control shaft; a crank arm fixed to the clutch control shaft and adapted for connecton to a traction drive clutching mechanism operative for effecting disengagement of the traction drive in response to the clutch-brake pedal being depressed through an initial range; a first motion transfer link means connecting the clutch control shaft to the brake control shaft; a brake pedal pivotally connected to the frame; a second motion transfer link means connecting the brake pedal to the brake control shaft; a normally disengaged brake element adapted for selective engagement with a rotating traction drive element; brake actuator link means coupling the brake control shaft to the brake element for effecting engagement of the latter in response to rotation of the brake control shaft; said first motion transfer link means including a first lost motion connection means which acts to transfer motion for rotating the brake control shaft only after the clutch-brake pedal is depressed to a brake-engage position beyond said initial range and which acts to prevent rotation of the brake control shaft, as effected by the brake pedal, from being transferred to the clutch-brake pedal; and said second motion transfer link means including a second lost motion connection means acting to transfer motion from the brake pedal to the brake control shaft but not vice-versa.

2. The clutch and brake control defined in claim 1 wherein said brake actuator link means includes a force limiting means for limiting the amount of force that can be delivered to the brake element by rotation of the brake control shaft.

3. The clutch and brake control defined in claim 1 wherein said brake element is a brake band having opposite ends; said brake actuator link means including a rod having one end linked to the ends of the brake band and having a head at its opposite end; a U-shaped member having a bight portion slidably mounted on the rod between the head and one end thereof; a coil compression spring acting between the rod head and the bight portion; and a crank arm fixed to the brake control shaft and pivotally connected to opposite legs of the U-shaped member.

4. The clutch and brake control defined in claim 1 and further including a park lock mechanism including a control rod rotatably supported from the frame in adjacent parallel relationship to the clutch control shaft; an abutment member fixed to the clutch control shaft; a locking pawl fixed to the control rod and selectively pivotable with the latter between an unlock position wherein the pawl is disposed free of the abutment member and a lock position wherein the pawl is disposed to engage the abutment member when the clutch-brake pedal is in its brake-engage position to maintain the clutch-brake pedal in its brake-engage position; biasing means urging the pawl towards its lock position and selectively releasable control lever means connected to the control rod and moveable between a first position wherein it maintains the pawl in the unlock position and a second position wherein it releases the pawl for movement to the lock position by action of the biasing means.

* * * * *